United States Patent [19]
Dekker

[11] Patent Number: 6,137,357
[45] Date of Patent: Oct. 24, 2000

[54] METHOD FOR ADJUSTING POWER OF TRANSMITTER, AND CONTROL ARRANGEMENT

[75] Inventor: André P Dekker, Oulu, Finland

[73] Assignee: Nokia Telecommunications OY, Espoo, Finland

[21] Appl. No.: 09/214,672

[22] PCT Filed: May 13, 1998

[86] PCT No.: PCT/FI98/00410

§ 371 Date: Mar. 26, 1999

§ 102(e) Date: Mar. 26, 1999

[87] PCT Pub. No.: WO98/52298

PCT Pub. Date: Nov. 19, 1998

[30] Foreign Application Priority Data

May 14, 1997 [FI] Finland ..................................... 972058

[51] Int. Cl.[7] .................................................. H03G 3/20
[52] U.S. Cl. .......................... 330/129; 330/140; 455/126
[58] Field of Search ................................... 330/129, 140, 330/141, 279, 281; 455/126

[56] References Cited

U.S. PATENT DOCUMENTS

| | | | |
|---|---|---|---|
| 3,003,116 | 10/1961 | Rockwell | 330/141 |
| 4,371,842 | 2/1983 | Lee | 330/141 |
| 5,128,629 | 7/1992 | Trinh | 330/129 |
| 5,598,126 | 1/1997 | Dekker | 330/129 |
| 5,854,971 | 12/1998 | Nagoya et al. | 455/126 |

FOREIGN PATENT DOCUMENTS

| | | |
|---|---|---|
| 481524 | 4/1992 | European Pat. Off. . |
| WO 95/08855 | 3/1995 | WIPO . |

Primary Examiner—Robert Pascal
Assistant Examiner—Henry Choe
Attorney, Agent, or Firm—Pillsbury Madison & Sutro LLP

[57] ABSTRACT

The invention relates to a method for transmitter power control and a control arrangement employed for transmitter power control. The control arrangement comprises a control element (1) controlled by a control signal, a sampling means (3) for taking samples of a signal from the control element (1). The control arrangement further comprises a detector (4), an adder (5) and a loop filter (6). The adder (5) and loop filter (6) form a controller for receiving a signal which is transmitted by the detector (4) and forms part of a feedback signal for controlling the control element (1). Between the input and output of the controller, the control arrangement comprises a parallel loop which, when being activated, keeps the feedback loop closed when the sample signal is outside the dynamic range of the detector (4). Keeping the feedback loop closed enables transmitter power control without discontinuities.

23 Claims, 4 Drawing Sheets

METHOD FOR ADJUSTING POWER OF TRANSMITTER, AND CONTROL ARRANGEMENT

BACKGROUND OF THE INVENTION

1. Field of the Invention

The invention relates to a method for controlling transmitter power, the method employing a control element controlled by a control signal, sampling means for taking samples of a signal from the control element, and a detector in connection with the sampling means, an adder and a loop filter, the adder and loop filter forming a controller for receiving a signal which is transmitted by the detector and forms part of a feedback signal for controlling the control element.

2. Description of Related Art

The invention is more closely related to switching the power of transmitters employed in GSM and DCS base stations, in particular. Network operators require a 30 to 42 dB wide adjustment range for transmitters that are switched on, i.e. in the ON position. In this situation the maximum power of a DCS base station transmitter can be 46 dBm and that of a GSM base station transmitter 58 dBm. The GSM recommendations specify the power level below which the transmitter is switched off, i.e. in the OFF position. In the OFF position the power level is below −36 dBm. The switching time should be below 15 $\mu$s with frequency hopping and below 30 $\mu$s with no frequency hopping. In addition, it must be possible to switch the power on and off without causing harmful transients on adjacent RF channels. With the transmitter in the ON position, a range of 30 dB, within which continuous power control is possible, should be left below the employed power. The above means that the dynamic range of power switching has to be continuous. In practice, the dynamic range should be e.g. between 63 and 75 dB.

A method of controlling the power of a high-frequency power amplifier is previously known. In the method the high-frequency power amplifier is controlled from the ON state to the OFF state by turning on an RF switch between a voltage-controlled attenuator and the high-frequency power amplifier. The high-frequency power amplifier is controlled from the OFF state to the ON state by turning off the RF switch.

The dynamic range of the power control arrangement is increased by switching a signal off by RF switches, whereby a shift occurs to the OFF state. A parallel loop is switched to the control arrangement at the same time as the signal is switched off. The parallel loop will slightly compensate for the transient problems caused by the rapid fading of the signal to be detected. The prior art solution has become quite complex. Furthermore, the solution requires very precise timing of RF switch control signals. Still further, the feedback signal of the control arrangement is not completely continuous, but has shown dead zones.

SUMMARY OF THE INVENTION

It is an object of the present invention to eliminate the above drawbacks. This is achieved by the solution of the invention, in which the transient, timing and power control problems associated with power switching are minimized.

This is achieved by a method of the type described in the introduction, characterized by using a parallel loop between the input and output of the controller, said loop, when becoming activated, keeping a feedback loop closed when the sample signal is outside the dynamic range of the detector, and, with the feedback loop kept closed, the transmitter power can be controlled without discontinuities.

The invention further relates to a power control arrangement employed for transmitter power control, the control arrangement comprising a control element controlled by a control signal, sampling means for taking samples of an output signal from the control element, and a detector in connection with the sampling means, an adder and a loop filter, the adder and loop filter forming a controller for receiving a signal which is transmitted by the detector and forms part of a feedback signal for controlling the control element.

The power control arrangement of the invention is characterized by comprising a parallel loop between the input and output of the controller, said loop, when becoming activated, keeping a feedback loop closed when the sample signal is outside the dynamic range of the detector, and, with the feedback loop kept closed, the transmitter power can be controlled without discontinuities.

The solution of the invention is based on the idea that the control element receives a continuous control signal which follows a set value, even if the signal arriving at the detector is outside the operating range of the detector.

The method of the invention provides several advantages. The method enables an increase in the dynamic range of the control arrangement, whereby the RF output signal can be adjusted and switched continuously. The method allows a continuous feedback signal to be formed. Said signal enables the transmission power to be switched on and off without the switching causing disturbing transients. The solution also enables precise power control compared with the power control of known solutions.

The control arrangement comprises a control element which receives a control signal, which is a function of a set value signal, even when the signal arriving at the detector is outside the normal operating range of the detector. Here, operating range refers to the dynamic range of the detector. The solution of the invention allows the use of timing signals having high tolerances.

DESCRIPTION OF THE DRAWINGS

In the following the invention will be described in greater detail with reference to examples according to the attached drawings, in which.

DESCRIPTION OF THE PREFERRED EMBODIMENTS

Figure 1:
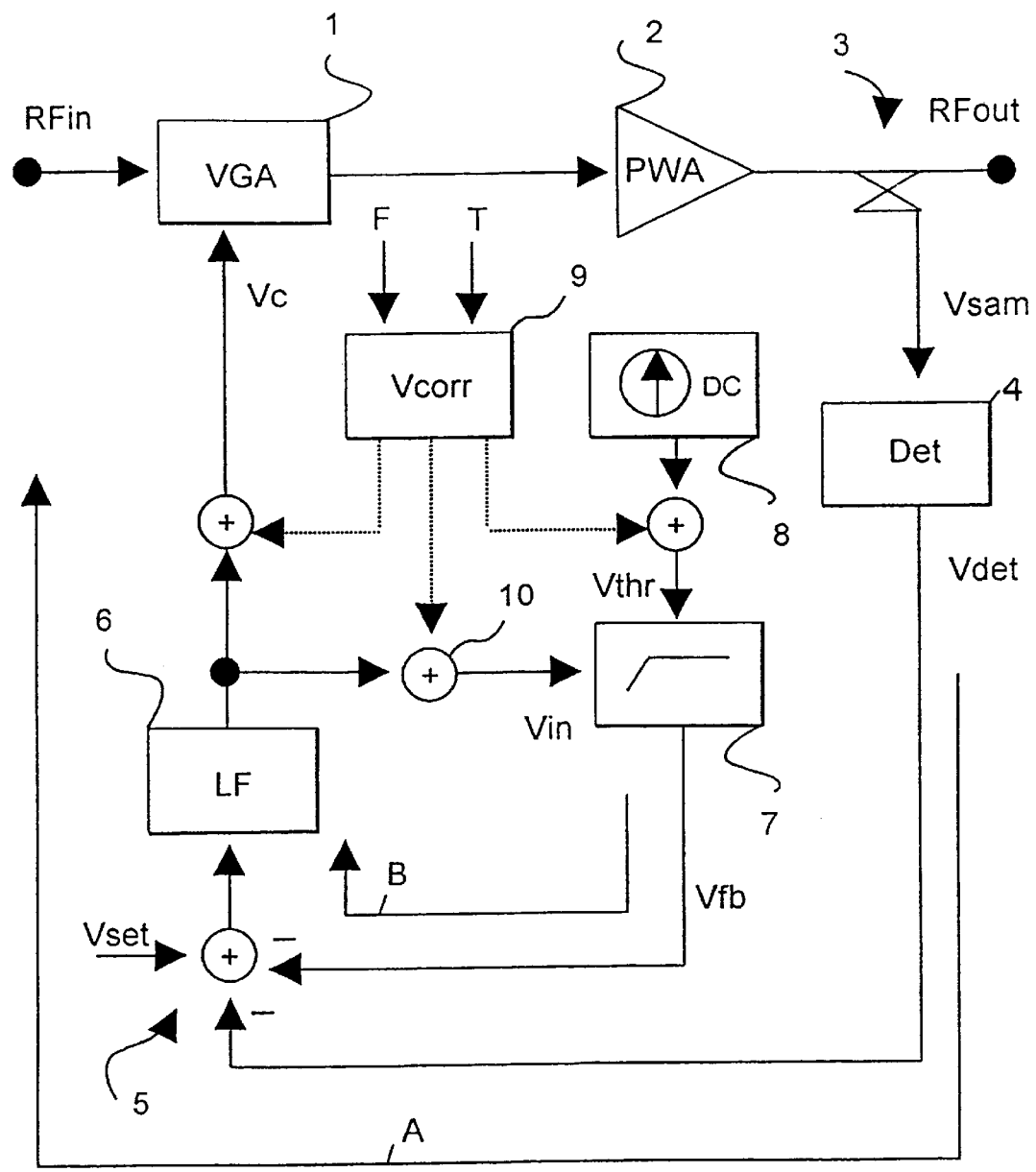
FIG. 1 shows a first preferred embodiment of the power control arrangement of the invention.

FIG. 1 shows the power control arrangement of the invention, comprising a control element 1 and an amplifier 2, connected to the control element 1. The arrangement further comprises a sampling means 3 connected to the amplifier 2. The sampling means 3 is implemented e.g. by a directional coupler. The control element 1 is implemented e.g. by a voltage-controlled amplifier (VGA). A signal from the amplifier 2 forms an output signal (Rfout) for the power control arrangement. The presented control arrangement is employed e.g. for transmitter power control.

The control arrangement further comprises a feedback loop (A) and a parallel loop (B). Furthermore, the arrangement comprises a detector 4 connected to the sampling means 3. The control arrangement further comprises an adder 5 and a loop filter 6. The adder 5 and the loop filter 6 form a controller which receives signals transmitted by the detector 4. The signal transmitted by the detector 4 forms part of a feedback signal for controlling the control element 1. The parallel loop comprises an adder element 10 and a means 7. The control arrangement also comprises a corrector element 9 which is preferably connected to the adder element 10. However, the use of the means 9 and 10 is not necessary in the invention. The control arrangement further comprises a means 8 for forming a reference signal (Vthr) for the means 7.

In practice the detector 4 is implemented by a diode, for example. The adder 5 is implemented by e.g. an operational amplifier, whereby the same operational amplifier can also be used as the loop filter. A set value signal (Vset) is coupled to the adder 5 and affects the power of the RF output signal. The set value signal is formed e.g. from a signal which is received from a digital waveform generator, converted into analog form, and filtered. The means 7 feeds to the feedback loop a signal (Vfb) which affects the magnitude of a control signal (Vc) of the control element 1. The means 7 forms part of the parallel loop of the control arrangement. In a solution according to the Figure, the means 7 is controlled by a signal Vin. The means 7 can be implemented by e.g. a diode circuit.

In the solution of the Figure, the RF input signal is fed to the control element 1. The control element can operate e.g. as a controllable RF amplifier or an RF attenuator. From the control element 1 the signal is fed via the amplifier 2 to the sampling means 3. In the solution of the Figure, the amplifier 2 operates as a power amplifier. The output signal of the amplifier 2 forms the output signal of the control arrangement. If needed, the control element 1 amplifies the signal to a degree that no separate power amplifier 2 is needed. Furthermore, the output signal of the control element 1 can preferably be subjected to frequency conversion before it is fed to the output of the control arrangement.

The sampling means 3 takes a sample of the output signal of the control arrangement. The sample signal (Vsam) taken by the sampling means 3 is proportional to the strength of the output signal of the control arrangement. The sample signal is fed to the detector 4, which detects the sample signal. In the solution of the Figure, the output signal (Vdet) of the detector 4 is assumed to be positive. It is also assumed that when the control signal of the control element 1 increases, the gain of the control element 1 also increases.

The adder 5 adds up the received signals and feeds the summed signals to the loop filter 6. The loop filter 6 filters harmful properties from the signal, such as voltage peaks. The loop filter 6 typically has a strong DC gain. The loop filter 6 can be implemented by e.g. an integrator. In case the feedback loop is not saturated, the high gain of the loop filter 6 makes the magnitude of the output signal of the detector 4 equal to that of the set value signal acting as the reference signal. Part of the output signal of the loop filter 6 is coupled via the adder element 10 to the means 7. Part of the output signal of the loop filter 6 is directly coupled to the control element 1. The means 7 feeds back its output signal to the adder 5 under control of the reference signal caused by the means 8.

The magnitude of the output signal of the detector 4 is proportional to the RF output signal. The smallest signal which is obtained from the output of the detector 4 and which still can be distinguished from noise and DC offset voltage, is denoted by Vtd. The signal arriving at the detector 4 and producing the signal Vtd at the output of the detector 4 is denoted by Vtrf. In practice, Vtrf is the threshold voltage of the detector 4. Vtd and Vtrf are constants whose values depend on the system employed.

If the power of the RF input signal is fixed, a certain control signal value causes an RF output signal to the detector 4. Let us first assume that the value of the signal from the corrector element 9 is zero. Let us also assume that the magnitude of the reference signal is set to equal that of the control signal Vc corresponding to the threshold voltage of the detector 4. When the level of the control signal falls below the threshold voltage of the detector, the output signal of the detector 4 remains substantially constant. In this situation the means 7 is activated by its input signal.

When the signal fed from the sampling means 3 to the detector 4 is below the threshold voltage of the detector 4, the output signal of the detector 4 remains unchanged. Consequently, in the above situation, the output signal of the detector 4 no longer follows the changes in RF power. Below the lower limit of the dynamic range of the detector 4, the means 7 is responsive to its input signal, whereby the missing output signal of the detector 4 is replaced by the output signal of the means 7. Accordingly, the means 7 feeds to the feedback loop a signal by which the feedback loop is kept closed. The signal fed to the feedback loop is caused by the signal from the controller.

The reference signal fed to the parallel loop is used to activate the parallel loop when the control signal becomes smaller than the reference signal fed to the parallel loop. The activation of the parallel loop keeps the feedback loop closed when the sample signal is outside the dynamic range of the detector 4. Keeping the feedback loop closed enables power control without discontinuities when the sample signal is preferably below the threshold voltage of the detector 4.

When the signal from the controller falls below the value of the reference signal, a signal whose magnitude substantially equals the difference between the control voltage of the control element 1 and the reference signal, is fed to the feedback loop. The reference signal substantially corresponds to the control signal of the control element 1, the control signal providing the transmitter output power corresponding to the threshold voltage of the detector 4. The parallel loop is activated when the control signal of the control element 1 becomes smaller than the reference signal. The reference signal can be a constant signal (DC signal), but alternatively the reference signal follows the control signal of the control element 1 fed to the parallel loop when the sample signal of the transmitter is above the threshold voltage of the detector 4. In addition the reference signal is kept at its current value when the sample signal of the transmitter falls below the threshold voltage of the detector 4.

The loop filter 6 feeds to the parallel loop a signal which, when falling below the value of the reference signal caused by the means 8 causes a stepless signal whose voltage remains substantially zero or constant to the loop filter 6.

The caused stepless signal follows the variations of the signal from the controller.

In the solution of the Figure, signals (T, F) fed to the corrector element 9 are used to compensate for the effect of heat and RF frequencies on the operation of the control arrangement. The temperature can change e.g. when no RF signal is transmitted for a long time. The frequency, in turn, always changes when no RF signal is transmitted. Frequency and temperature compensation prevents power control at the wrong reference signal value. Because no signal is transmitted at the instant when frequency or temperature changes, it is impossible to measure in real time the effects of the above factors on control signal value, which corresponds to the threshold voltage of the detector 4. This is why the above effects are measured and stored beforehand and cannot be corrected adaptively. The effects of temperature and frequency on the control signal can be compensated for by feeding a compensation signal to the control signal, to the reference signal or to the signal from the controller to the parallel loop.

Figure 2:
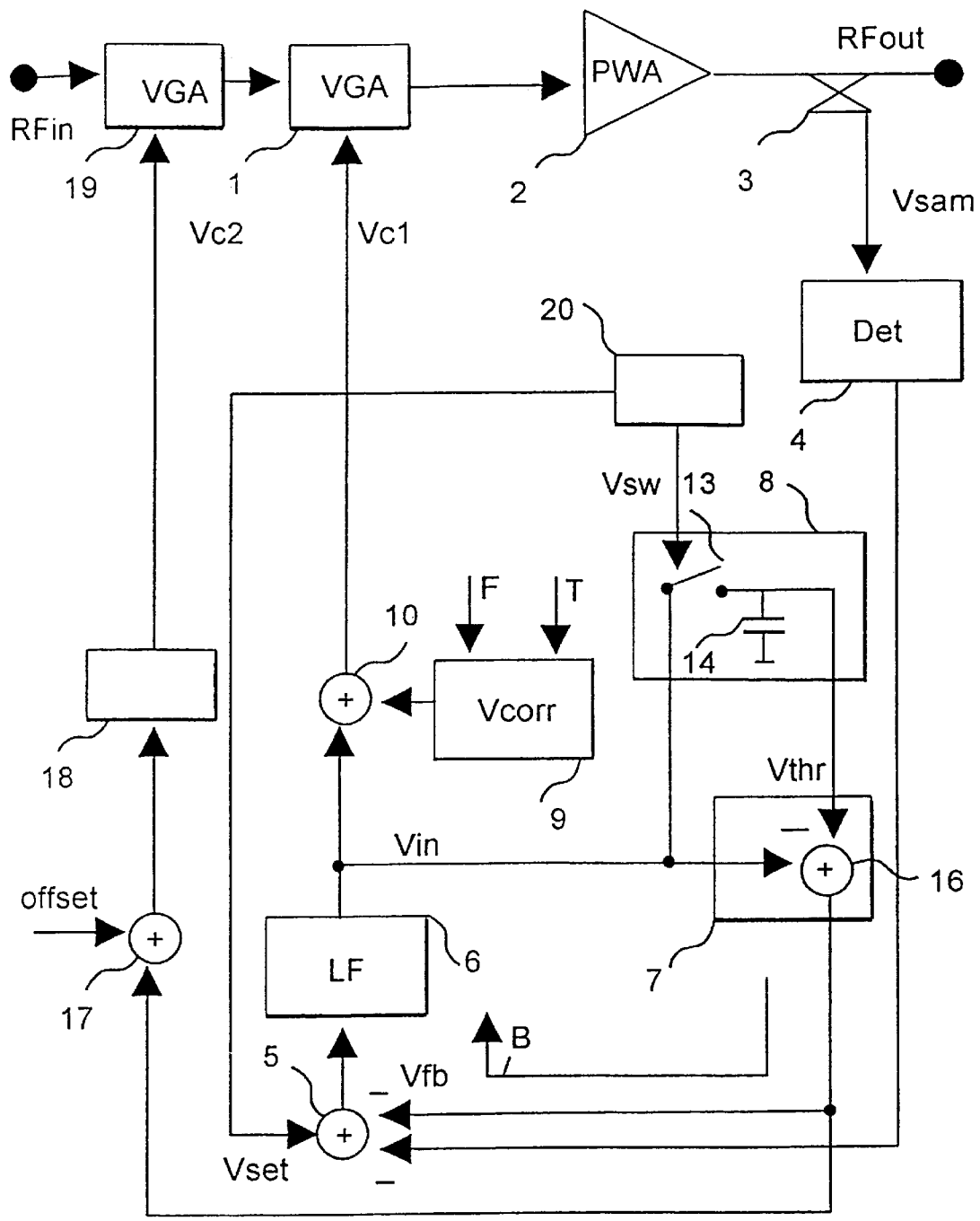
FIG. 2 shows a second preferred embodiment of the power control arrangement of the invention.

FIG. 2 shows a power control arrangement also comprising a means 16. The means 16 is placed in the means 7. The Figure shows that the means 8 is implemented by means of a switch 13 and a capacitor 14. In the solution of the Figure, the means 8 operates as a Track & Hold circuit. When the RF output signal is within the dynamic range of the detector 4, the switch 13 is closed, whereby the capacitor 14 is charged. The voltage of the capacitor 14 follows the voltage Vin. Similarly, the means 16 receives two equally high input voltages and the means 16 causes at its output a zero output signal. In the above situation the means 16 operates as a subtractor.

When the RF output signal falls below the threshold voltage of the detector 4, the switch 13 is opened. The voltage to which the capacitor 14 has been charged allows the control signal corresponding to the threshold voltage of the detector 4 to be identified. In other words, the capacitor acts as a memory in which the voltage value is loaded. The means 16 causes an output signal, obtained from the difference between the control signal of the control element 1 and a previously active control signal of the control element 1. Here, a previously active control signal refers to the control signal value which was active when the RF output signal passed the threshold voltage of the detector 4. Part of the output signal caused by the means 16 is coupled to the feedback loop.

The RF output signal closely follows the set value signal. It is possible to conclude on the basis of the set value signal whether the RF output signal is below or above the threshold voltage of the detector 4. If the set value signal falls below the threshold voltage (Vtd) of the detector 4, the switch 13 opens and the signal acting at the inverting input of the means 16 remains constant. The parallel loop is then activated. As a result of this, the loop filter 6 changes into a DC amplifier having low amplification. Because of the low amplification, the loop filter 6 is not saturated. The output signal of the loop filter 6 continuously follows the changes in the set value signal. The output of the loop filter 6 follows the changes even when there is no longer any feedback through the detector 4. Keeping the feedback loop closed enables transmitter power control without discontinuities when the sample signal is below the threshold voltage of the detector 4.

As the set value signal increases and finally exceeds the threshold voltage of the detector 4, the output signal of the loop filter 6 becomes equal to the voltage to which the capacitor 14 has been charged. When the threshold voltage of the detector 4 is exceeded while the switch is closed, there will be no discontinuities in power control. The arrangement comprises a means 20 which causes the set value signal. The set value signal can be formed by e.g. D/A conversion.

In the solution of FIG. 2, the means 20 also causes a control signal (Vsw) for controlling the switch 13. The control signal (Vsw) activates the parallel loop when the sample signal is below the threshold voltage of the detector 4. The control signal (Vsw) activates the parallel loop when the detected signal (Vdet) or the set value signal (Vset) fed to the adder element (5) is below the output voltage (Vtd) corresponding to the threshold voltage of the detector (4). In other words, the parallel loop is activated when the signal Vset is below the voltage Vtd. In that case the sample signal and the output signal of the detector are also in practice below the threshold voltage of the detector. The switch control signal can also be formed from the signals Vdet and Vsam. The switch control signal can be formed by e.g. digital logic.

The solution further comprises a means 17, a means 18, and a control element 19 coupled to the RF signal path. The solution may comprise several control elements. The control element 19 is controlled by a signal received from the output side of the parallel loop. The control element 19 brings about a reduction in the transmitter RF signal when the RF signal falls below the dynamic range of the detector 4. In the solution of the Figure, the RF input signal is fed to the control element 19, and the signal is then fed via the control element 1 to the amplifier 2.

Part of the output signal of the means 7 is fed to the means 17. An offset voltage is also fed to the means 17. The means 17 adds up the offset voltage and the signal from the means 7. The means 17 transfers the signal to an operational level corresponding to the control voltage of the control element 19. The signal caused by the means 17 is fed via the means 18 to the control element 19. If needed, the means 18 amplifies the received signal. If needed, the means 18 also operates non-linearly. Non-linearity enables compensation of e.g. non-linearities in the control characteristic of the control element 19. The means 18 also subjects the received signal to voltage current conversion when the control element 19 requires current control.

In practice the control element 19 is implemented in the same way as the control element 1. The control element 19 enables a wider attenuation or amplification range for the RF signal. At its maximum amplification the control element 19 operates on high RF output signals. Here "high output signals" refers to signals which are higher than the threshold voltage of the detector 4. Although the dynamic range of the control arrangement is implemented by two control elements 1, 19, only one control element affects the operation of the control arrangement when the loop is closed. This allows the effect of the control element 1 on the control to be optimized without any need to know the precise operation of the control element 19. The effect of the control element 19 on control is not critical for two reasons:

a) the control element 19 is active when the RF output signal is low, whereby no large transients are formed, b) the control element 19 is not part of the closed loop.

Figure 3:
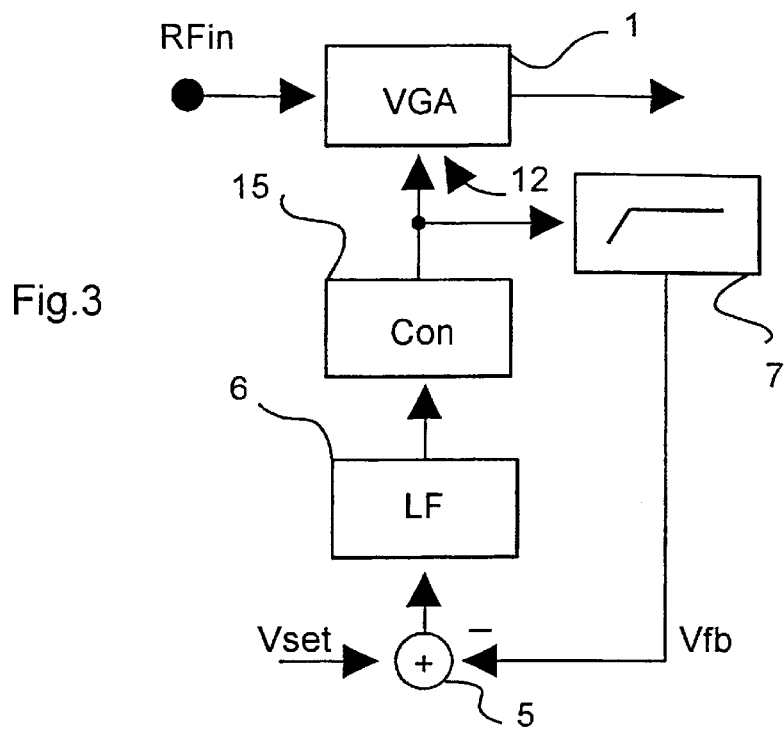
FIG. 3 shows a first preferred embodiment of the generation of an input signal for means employed in the power control arrangement.

FIG. 3 shows a first preferred solution for forming the input signal of the means 7. In addition to the above presented blocks, the arrangement comprises a signal converter 15, which is coupled between the loop filter 6 and the control element 1. The output side of the loop filter 6 is coupled to the input of the signal converter 15, and the output side of the signal converter 15 is coupled to the control input 12 of the control element 1 and to the means 7. In this solution the signal converter 15 converts the control signal into a suitable form for the means 7 and the control element 1. The functions of the signal converter 15 substantially correspond to the functions of the means 18.

Figure 4:
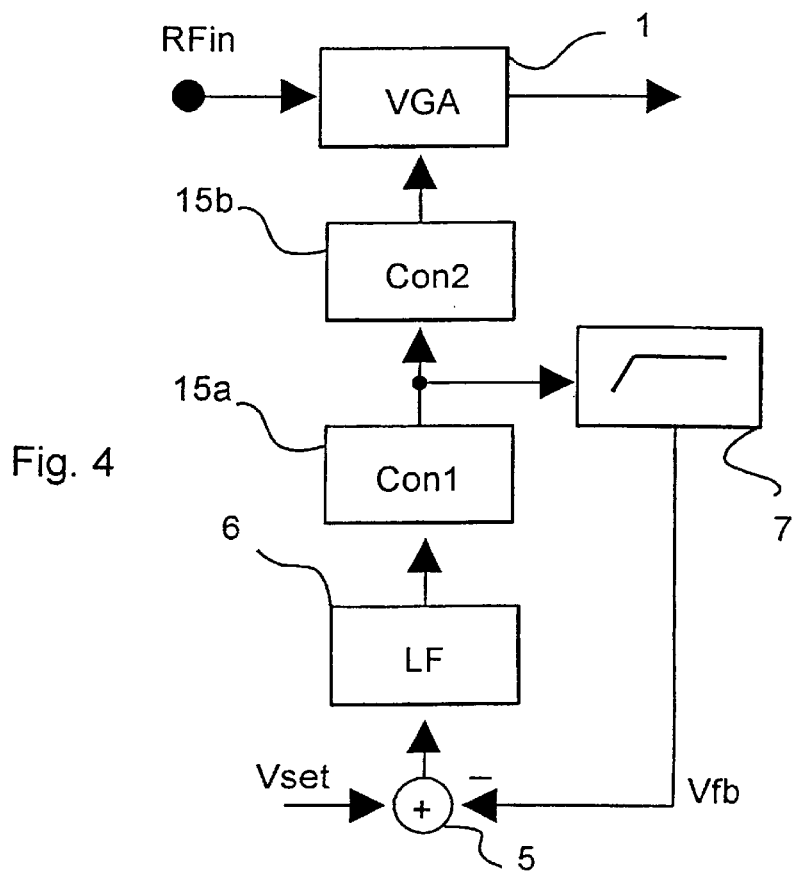
FIG. 4 shows a second preferred embodiment of the generation of an input signal for means employed in the power control arrangement.

FIG. 4 shows a second preferred solution for forming the input signal of the means 7. In addition to the above presented blocks, the arrangement comprises a signal converter 15a and a signal converter 15b. In the arrangement, the output side of the loop filter 6 is coupled to the input of the signal converter 15a. Further, the output of the signal converter 15a is coupled to the input side of the signal converter 15b and of the means 7. In the presented solution the output signal of the signal converter 15b is used to control the control element 1. The means 7 comprised by the parallel loop is coupled so that the means 7 receives its input signal from between the output side of the signal converter 15a and the input side of the signal converter 15b. The converters 15 and 15a may compensate for the non-linearities of the control characteristic of the control element 1. The control converter 15b is used as a voltage/current converter when the control element 1 requires current control.

Figure 5:
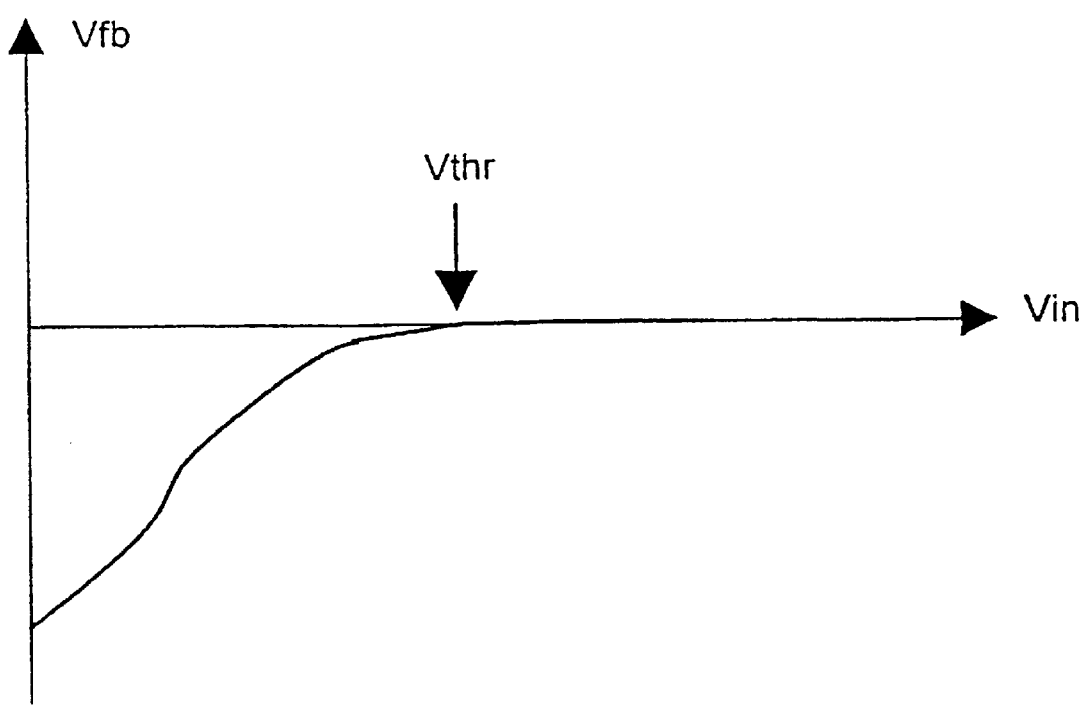
FIG. 5 shows the output voltage of the means employed in the power control arrangement as a function of the input voltage.

FIG. 5 shows by way of example a curve which clarifies the operation of the solution of the invention. The signal from the loop filter 6 to the means 7 is the x-axis of the curve. The signal from the means 7 to the adder element 5 is the y-axis of the curve. FIG. 5 clearly shows that the means 7 feeds a continuous and monotonously increasing signal to the adder element 5. Said signal remains constant when the voltage Vin exceeds the voltage Vthr. As the signal from the loop filter 6 increases, the signal from the means 7 to the adder element 5 increases so that the signal shows no abrupt steps.

Even though the invention has been explained in the above with reference to examples in accordance with the accompanying drawings, it is obvious that the invention is not restricted to them but can be modified in various ways within the scope of the inventive idea disclosed in the attached claims.

What is claimed is:

1. A method for controlling transmitter power in a system including a control element controlled by a control signal, sampling means for taking samples of a signal from the control element, and a detector in connection with the sampling means, an adder and a loop filter, the adder and loop filter forming a controller for receiving a signal which is transmitted by the detector and forms part of a feedback signal for controlling the control element, the method comprising:

using a parallel loop between the input and output of the controller, said loop, when becoming activated, keeping a feedback loop closed when a value of the sampled signal is outside a dynamic range of the detector, thereby controlling the transmitter power without discontinuities;

wherein when the sampled signal value falls below the dynamic range of the detector, a control signal value that causes a detector input signal of the magnitude of the threshold voltage of the detector, is loaded into a memory.

2. A method for controlling transmitter power in a system including a control element controlled by a control signal, sampling means for taking samples of a signal from the control element, and a detector in connection with the sampling means, an adder and a loop filter, the adder and loop filter forming a controller for receiving a signal which is transmitted by the detector and forms part of a feedback signal for controlling the control element, the method comprising:

using a parallel loop between the input and output of the controller, said loop, when becoming activated, keeping a feedback loop closed when a value of the sampled signal is outside a dynamic range of the detector, thereby controlling the transmitter power without discontinuities;

wherein another control signal is fed to the parallel loop and activates the parallel loop when the sampled signal value is below a threshold voltage of the detector.

3. A method for controlling transmitter power in a system including a control element controlled by a control signal, sampling means for taking samples of a signal from the control element, and a detector in connection with the sampling means, an adder and a loop filter, the adder and loop filter forming a controller for receiving a signal which is transmitted by the detector and forms part of a feedback signal for controlling the control element, the method comprising:

using a parallel loop between the input and output of the controller, said loop, when becoming activated, keeping a feedback loop closed when a value of the sampled signal is outside a dynamic range of the detector, thereby controlling the transmitter power without discontinuities;

wherein another a control signal is fed to the parallel loop and activates the parallel loop when a value of a detected signal or a set value signal fed to the adder, is below an output voltage corresponding to a threshold voltage of the detector.

4. A method for controlling transmitter power in a system including a control element controlled by a control signal, sampling means for taking samples of a signal from the control element, and a detector in connection with the sampling means, an adder and a loop filter, the adder and loop filter forming a controller for receiving a signal which is transmitted by the detector and forms part of a feedback signal for controlling the control element, the method comprising:

using a parallel loop between the input and output of the controller, said loop, when becoming activated, keeping a feedback loop closed when a value of the sampled signal is outside a dynamic range of the detector, thereby controlling the transmitter power without discontinuities;

wherein a reference signal is fed to the parallel loop, and the parallel loop is activated when a value of the control signal to the control element becomes smaller than a value of the reference signal; and wherein the reference signal follows the control signal of the control element fed to the parallel loop when the transmitter sampled signal value is above a threshold voltage of the detector, and the reference signal is kept at a present value when the transmitter sampled signal value falls below the threshold voltage of the detector.

5. A method for controlling transmitter power in a system including a control element controlled by a control signal, sampling means for taking samples of a signal from the control element, and a detector in connection with the sampling means, an adder and a loop filter, the adder and loop filter forming a controller for receiving a signal which is transmitted by the detector and forms part of a feedback signal for controlling the control element, the method comprising:

using a parallel loop between the input and output of the controller, said loop, when becoming activated, keeping a feedback loop closed when a value of the sampled signal is outside a dynamic range of the detector, thereby controlling the transmitter power without discontinuities;

wherein a reference signal is fed to the parallel loop, and the parallel loop is activated when a value of the control signal to the control element becomes smaller than a value of the reference signal; and keeping the feedback loop closed by feeding to the feedback loop a closing signal, which is formed from a controller signal from the controller, and which, when falling below the value of the reference signal, causes to be input to the feedback loop a signal which is substantially equal to a difference between a value of the control signal of the control element and a value of the reference signal.

6. A method for controlling transmitter power in a system including a control element controlled by a control signal, sampling means for taking samples of a signal from the control element, and a detector in connection with the sampling means, an adder and a loop filter, the adder and loop filter forming a controller for receiving a signal which is transmitted by the detector and forms part of a feedback signal for controlling the control element, the method comprising:

using a parallel loop between the input and output of the controller, said loop, when becoming activated, keeping a feedback loop closed when a value of the sampled signal is outside a dynamic range of the detector, thereby controlling the transmitter power without discontinuities;

wherein a reference signal is fed to the parallel loop, and the parallel loop is activated when a value of the control signal to the control element becomes smaller than a value of the reference signal; and feeding to the parallel loop a signal, which is formed from a signal from the controller, and which, when falling below the value of the reference signal, causes to be input to the loop filter a stepless signal whose voltage remains substantially zero.

7. A method for controlling transmitter power in a system including a control element controlled by a control signal, sampling means for taking samples of a signal from the control element, and a detector in connection with the sampling means, an adder and a loop filter, the adder and loop filter forming a controller for receiving a signal which is transmitted by the detector and forms part of a feedback signal for controlling the control element, the method comprising:

using a parallel loop between the input and output of the controller, said loop, when becoming activated, keeping a feedback loop closed when a value of the sampled signal is outside a dynamic range of the detector, thereby controlling the transmitter power without discontinuities;

wherein a reference signal is fed to the parallel loop, and the parallel loop is activated when a value of the control signal to the control element becomes smaller than a value of the reference signal; and feeding to the parallel loop a signal, which is formed from a signal from the controller, and which, when falling below the value of the reference signal, causes to be input to the loop filter a stepless signal whose voltage remains substantially constant.

8. A method as claimed in claim 6 or 7, wherein the stepless signal follows variations in the signal from the controller.

9. A method for controlling transmitter power in a system including a control element controlled by a control signal, sampling means for taking samples of a signal from the control element, and a detector in connection with the sampling means, an adder and a loop filter, the adder and loop filter forming a controller for receiving a signal which is transmitted by the detector and forms part of a feedback signal for controlling the control element, the method comprising:

using a parallel loop between the input and output of the controller, said loop, when becoming activated, keeping a feedback loop closed when a value of the sampled signal is outside a dynamic range of the detector, thereby controlling the transmitter power without discontinuities;

wherein a reference signal is fed to the parallel loop, and the parallel loop is activated when a value of the control signal to the control element becomes smaller than a value of the reference signal; and wherein effects of frequency and temperature on the control signal of the control element are compensated for by feeding a compensating signal to said control signal, to said reference signal or to said signal from the controller to the parallel loop.

10. A method for controlling transmitter power in a system including a control element controlled by a control signal, sampling means for taking samples of a signal from the control element, and a detector in connection with the sampling means, an adder and a loop filter, the adder and loop filter forming a controller for receiving a signal which is transmitted by the detector and forms part of a feedback signal for controlling the control element, the method comprising:

using a parallel loop between the input and output of the controller, said loop, when becoming activated, keeping a feedback loop closed when a value of the sampled signal is outside a dynamic range of the detector, thereby controlling the transmitter power without discontinuities; and employing at least one control element coupled to an RF signal path and controlled by a signal obtained from an output side of the parallel loop, the control element being used to bring about a reduction in a value of a transmitter RF signal when the RF signal falls below the dynamic range of the detector.

11. A control arrangement employed for transmitter power control, the control arrangement comprising:

a control element controlled by a control signal;

sampling means for taking samples of a signal from the control element;

a detector in connection with the sampling means;

an adder and a loop filter, the adder and loop filter forming a controller for receiving a signal which is transmitted by the detector and forms part of a feedback signal for controlling the control element;

a parallel loop between an input and output of the controller, said loop, when becoming activated, keeping a feedback loop closed when a value of the sampled signal is outside the dynamic range of the detector, and, with the feedback loop kept closed, the transmitter power being controlled without discontinuities; and means for providing another control signal that activates the parallel loop when the sampled signal value of the parallel loop is below a threshold voltage of the detector.

12. A control arrangement employed for transmitter power control, the control arrangement comprising:

a control element controlled by a control signal;

sampling means for taking samples of a signal from the control element;

a detector connected to the sampling means;

an adder and a loop filter, the adder and loop filter forming a controller for receiving a signal which is transmitted by the detector and forms part of a feedback signal for controlling the control element;

a parallel loop between an input and output of the controller, said loop, when becoming activated, keeping a feedback loop closed when a value of the sampled signal is outside the dynamic range of the detector, and, with the feedback loop kept closed, the transmitter power being controlled without discontinuities;

means for providing a reference signal to the parallel loop, the parallel loop being activated when a value of the control signal of the control element becomes smaller than a value of said reference signal; and wherein the provided reference signal follows the control signal value when a transmitter sample signal is above a threshold voltage of the detector, and the reference signal remains at a present value when the transmitter sample signal falls below the threshold voltage of the detector.

13. A control arrangement employed for transmitter power control, the control arrangement comprising:

a control element controlled by a control signal;

sampling means for taking samples of a signal from the control element;

a detector connected to the sampling means;

an adder and a loop filter, the adder and loop filter forming a controller for receiving a signal which is transmitted by the detector and forms part of a feedback signal for controlling the control element;

a parallel loop between an input and output of the controller, said loop, when becoming activated, keeping a feedback loop closed when a value of the sampled signal is outside the dynamic range of the detector, and, with the feedback loop kept closed, the transmitter power being controlled without discontinuities;

means for providing a reference signal to the parallel loop, the parallel loop being activated when a value of the control signal of the control element becomes smaller than a value of said reference signal; and wherein a value of the provided reference signal substantially corresponds to a value of the control signal of the control element, the control signal causing a transmitter output power corresponding to a threshold voltage of the detector.

14. A control arrangement employed for transmitter power control, the control arrangement comprising:

a control element controlled by a control signal;

sampling means for taking samples of a signal from the control element;

a detector connected to the sampling means;

an adder and a loop filter, the adder and loop filter forming a controller for receiving a signal which is transmitted by the detector and forms part of a feedback signal for controlling the control element;

a parallel loop between an input and output of the controller, said loop, when becoming activated, keeping a feedback loop closed when a value of the sampled signal is outside the dynamic range of the detector, and, with the feedback loop kept closed, the transmitter power being controlled without discontinuities; and means for providing a signal when a value of a signal from the controller falls below a value of the reference signal, the provided signal causing to be input to the loop filter a stepless signal whose voltage remains substantially zero.

15. A control arrangement as claimed in claim 11, wherein the loop filter feeds to the parallel loop a signal which, when falling below a value of the reference signal, causes to be input to the loop filter a stepless signal whose voltage remains substantially constant.

16. A control arrangement employed for transmitter power control, the control arrangement comprising:

a control element controlled by a control signal;

sampling means for taking samples of a signal from the control element;

a detector connected to the sampling means;

an adder and a loop filter, the adder and loop filter forming a controller for receiving a signal which is transmitted by the detector and forms part of a feedback signal for controlling the control element;

a parallel loop between an input and output of the controller, said loop, when becoming activated, keeping a feedback loop closed when a value of the sampled signal is outside the dynamic range of the detector, and, with the feedback loop kept closed, the transmitter power being controlled without discontinuities; and means operating as a memory, to which is loaded a control signal value of the control element, the value causing a detector output signal equal to a detector threshold voltage when the sampled signal value falls below the dynamic range of the detector.

17. A control arrangement employed for transmitter power control, the control arrangement comprising:

a control element controlled by a control signal;

sampling means for taking samples of a signal from the control element;

a detector connected to the sampling means;

an adder and a loop filter, the adder and loop filter forming a controller for receiving a signal which is transmitted by the detector and forms part of a feedback signal for controlling the control element;

a parallel loop between an input and output of the controller, said loop, when becoming activated, keeping a feedback loop closed when a value of the sampled signal is outside the dynamic range of the detector, and, with the feedback loop kept closed, the transmitter power being controlled without discontinuities; and means for forming from a signal from the controller, a stepless signal which the means for providing from the stepless signal feeds back to the feedback loop.

18. A control arrangement as claimed in claim 17, further comprising means for causing in the parallel loop a reference signal, and when a signal from the controller falls below a value of the reference signal, the means for forming from the controller signal a stepless signal causing in the feedback loop a signal which is substantially equal to a difference between a control voltage of the control element and said reference signal.

19. A control arrangement employed for transmitter power control, the control arrangement comprising:

a control element controlled by a control signal;

sampling means for taking samples of a signal from the control element;

a detector connected to the sampling means;

an adder and a loop filter, the adder and loop filter forming a controller for receiving a signal which is transmitted by the detector, the controller proudcing part of a feedback signal for controlling the control element;

a parallel loop between an input and output of the controller, said loop, when becoming activated, keeping a feedback loop closed when a value of the sampled signal is outside the dynamic range of the detector, and, with the feedback loop kept closed, the transmitter power being controlled without discontinuities; and means for providing a reference signal to the parallel loop, the parallel loop being activated when a value of the control signal of the control element becomes smaller than a value of said reference signal;

wherein the means for providing a reference signal follows the control voltage by means of at least a Track & Hold circuit.

20. A control arrangement as claimed in claim 14 or 15, wherein the stepless signal follows variations in the signal produced by the controller.

21. A control arrangement employed for transmitter power control, the control arrangement comprising:

a control element controlled by a control signal;

sampling means for taking samples of a signal from the control element;

a detector connected to the sampling means;

an adder and a loop filter, the adder and loop filter forming a controller for receiving a signal which is transmitted by the detector and forms part of a feedback signal for controlling the control element;

a parallel loop between an input and output of the controller, said loop, when becoming activated, keeping a feedback loop closed when a value of the sampled signal is outside the dynamic range of the detector, and, with the feedback loop kept closed, the transmitter power being controlled without discontinuities; and at least one control element coupled to an RF signal path and controlled by a signal obtained from the parallel loop, the control element bringing about a reduction in a value of a transmitter RF signal when the RF signal falls below the dynamic range of the detector.

22. A control arrangement employed for transmitter power control, the control arrangement comprising:

a control element controlled by a control signal;

sampling means for taking samples of a signal from the control element;

a detector connected to the sampling means;

an adder and a loop filter, the adder and loop filter forming a controller for receiving a signal which is transmitted by the detector and forms part of a feedback signal for controlling the control element;

a parallel loop between an input and output of the controller, said loop, when becoming activated, keeping a feedback loop closed when a value of the sampled signal is outside the dynamic range of the detector, and, with the feedback loop kept closed, the transmitter power being controlled without discontinuities;

means for forming a reference signal to the parallel loop, the parallel loop being activated when a value of the control signal of the control element becomes smaller that a value of said reference signal; and means for compensating for frequency and temperature effects on the control signal by feeding a compensating signal to the control signal, to the reference signal or to the signal fed from the controller to the parallel loop.

23. A control arrangement as claimed in claim 18 wherein the means for causing follows the control voltage by means of at least a Track & Hold circuit.

* * * * *